United States Patent [19]

Szczepanek

[11] 4,146,298
[45] Mar. 27, 1979

[54] COUPLER FOR OPTICAL FIBER WAVEGUIDES AND METHOD OF CONSTRUCTING SAME

[75] Inventor: Paul S. Szczepanek, Laurel, Md.

[73] Assignee: The United States of America as represented by the Secretary of the Army, Washington, D.C.

[21] Appl. No.: 773,374

[22] Filed: Mar. 1, 1977

[51] Int. Cl.² .................................................. G02B 5/14
[52] U.S. Cl. ............................ 350/96.15; 350/96.19; 350/3.72
[58] Field of Search ................. 350/3.5, 96 C, 96 WG

[56] References Cited

U.S. PATENT DOCUMENTS

| 3,777,149 | 12/1973 | Marcatili | 350/96 WG X |
| 3,809,455 | 5/1974 | Pekau | 350/96 WG |
| 3,931,518 | 1/1976 | Miller | 350/96 C X |

OTHER PUBLICATIONS

K. Pennington and E. A. Ash, "Fast Wave Optical Guide Couplers Using Holographic Elements", IBM Tech Disc Bull., vol. 13, No. 8, Jan. 1971, 2280–2281.

*Primary Examiner*—Rolf G. Hille
*Attorney, Agent, or Firm*—John R. Utermohle; Barry N. Young

[57] ABSTRACT

A method for constructing and an apparatus for accessing individual or multiple guided optical fiber modes. Coupling can be accomplished at any point along an optical fiber through the fiber cladding. The coupler is based upon a technique for converting a guided optical mode into a leaky mode by varying the index of refraction of the optical fiber cladding. Transforming between the leaky mode radiation and a desired spatial power distribution is accomplished by a holographic coupler. Other propagating modes are unaffected by the coupling region. This coupling method and apparatus has application when it is required to make multiple taps along a common optical fiber as well as when it is necessary to access individual fiber modes.

11 Claims, 9 Drawing Figures

COUPLER FOR OPTICAL FIBER WAVEGUIDES AND METHOD OF CONSTRUCTING SAME

BACKGROUND OF THE INVENTION

The present invention relates generally to the field of optical communications and more particularly to the field of coupling of light into and out of optical waveguides.

The advantages of using optical transmission systems for communications are well recognized. Optical waveguides comprising dielectric fibers having a transparent core coaxially surrounded by a cladding material of lower dielectric index may be used to guide and transmit optical signals over long distances in optical communications systems. Since signals are transmitted at optical frequencies, these optical fibers are characterized by extremely large bandwidths and hence are capable of handling large amounts of information. Furthermore, by proper design, optical fibers are capable of supporting multi-mode propagation. Each propagating mode is independent of other propagating modes and can be used for the transmission of independent signals. Due to their relatively small physical size and large bandwidth capabilities, optical fiber communication systems offer attractive alternatives to conventional communication systems in many applications.

Typically, in optical communication systems, light from a laser, light emitting diode (LED) or some other source is coupled into the end of an optical fiber. The light propagates through the fiber core and can be detected at the opposite end of the fiber, to form a point-to-point communication system. Specific propagating modes can be launched into the fiber to carry independent signals but this generally requires expensive optics systems and precise alignment of the light source used for each mode with the end of the fiber. Such optics systems and alignments are not always easily adaptable to multi-mode coupling. Furthermore, if it is desired to communicate with intermediate stations along the length of the fiber, it is generally necessary to physically interrupt the fiber, detect the various propagating modes, strip out the desired mode and relaunch the remaining modes back into the fiber to continue their propagation to the other end or to the next intermediate station where this process is repeated. This is a significant disadvantage of optical fiber communication systems when it is desired to communicate with a number of intermediate stations along the length of the fiber.

One method of avoiding this disadvantage to some extent, is to employ bundles of many fibers, with a separate fiber connecting each of the various intermediate stations with every other intermediate station. This eliminates the need for the expensive optics systems required at each station to couple to unwanted modes but has the further disadvantages of requiring the use of many fibers and not fully utilizing the entire capacity of each fiber.

In the area of coupling light into thin-film integrated circuit optical waveguides, some work has been done utilizing holograms to form phase gratings on the flat face of a thin-film waveguide. The hologram serves to convert an incident light beam into a planewave whose direction of propagation is such as to excite a predetermined mode in the waveguide. Typical is U.S. Pat. No. 3,885,856 to Ostrowsky et al. which discloses a holographic method for implementing such a coupler and U.S. Pat. No. 3,864,016 to Dakss et al. which discloses a similar coupler, adaptable to coupling light from the end of a number of optical fibers into integrated optical circuits. These couplers however, are useful only with integrated circuit optical waveguides.

It is desirable to have a coupler for optical fiber waveguides which will overcome the aforesaid disadvantages and it is to this end that the present invention is directed.

SUMMARY OF THE INVENTION

The present invention is based upon the principle that a guided mode in an optical fiber can become a leaky mode in a region of the fiber where the index of refraction of the cladding is increased. As a leaky mode, a fraction of the propagating energy in the fiber will be coupled out through the cladding of the fiber. Coupling to this leaky mode radiation may be accomplished by utilizing a holographic coupler. Furthermore, by proper design, other propagating modes in the fiber will be unaffected by the coupler.

Therefore, it is an object of this invention to provide a method of construction and an apparatus for coupling to selected individual or multiple guided optical fiber modes.

It is a further object of this invention to provide a method and apparatus for coupling which will permit coupling at any point along the length of an optical fiber waveguide, without disrupting the fiber.

It is also an object of this invention to provide a method and apparatus for coupling which will not affect other non-desired guided modes propagating in an optical fiber.

It is additionally an object of this invention to provide a method and apparatus for coupling which is inexpensive and easily implemented.

A method for constructing a coupler for coupling light into or out of an optical fiber waveguide which provides these and other advantages, may include converting at least one selected guided optical mode propagating in an optical fiber waveguide to a leaky mode wave such that a portion of the energy in the guided mode is coupled through the cladding of the optical fiber and providing a transformation between the leaky mode wave and a desired spatial power distribution at a point.

An apparatus which provides these and other advantages may include means for converting either at least one selected guided optical mode propagating in the optical fiber to a leaky mode wave propagating outside of said fiber or from a leaky mode wave propagating outside of the fiber to a guided optical mode propagating in the fiber and means in optical correspondence with the leaky mode wave for providing a transformation between the leaky mode wave and a desired spatial power distribution at a point.

BRIEF DESCRIPTION OF THE DRAWINGS

The principles of the invention and the description of the preferred embodiments can be more fully appreciated when read in conjunction with the drawings in which.

DETAILED DESCRIPTION OF THE INVENTION

Figure 1:
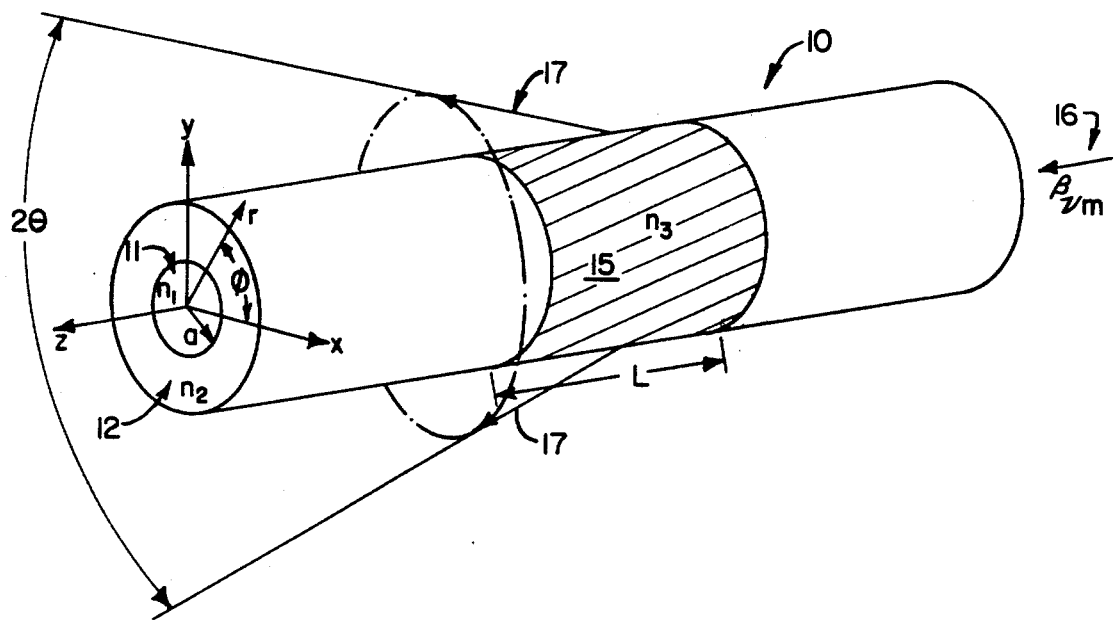
FIG. 1 is an illustration of a method for converting guided optical fiber modes into a leaky mode waves.

An optical fiber capable of supporting the propagation of optical waves is illustrated in FIG. 1. The optical fiber 10 consists of a core 11 having an index of refraction, $n_1$, surrounded by a cladding 12 having an index of refraction, $n_2$, which is less than $n_1$. The core index, $n_1$, may be uniform, in which case the fiber is called a step-index fiber, or the core index, $n_1$, may vary as a function of the radius of the core, in accordance with some profile. Fibers of the latter type are termed graded-index fibers. Although both types of fibers are capable of supporting multi-mode propagation, it has been shown that graded-index fibers possess certain advantages for multi-mode propagation. See Multimode Theory of Graded-Core Fibers, by D. Gloge and E. Marcatili, Bell System Technical Journal, Vol. 52, No. 9, November 1973, p 1563. Fiber 10 of FIG. 1 may be of either type.

In a region of the cladding of the fiber 10 in FIG. 1, the index of refraction has been increased from $n_2$ to $n_3$, to form a coupling region 15. In accordance with the principles herein later described, a propagating mode 16 designated by propagation constant, $\beta_{vm}$, which is propagating in the right-hand section of the fiber core, is converted to a leaky mode 17—17 in the coupling region 15. A fraction of the energy of propagating mode 16 is thus coupled out of the fiber through the cladding in the coupling region 15. The ratio of the power coupled out of the fiber, $P_{out}$, to the power propagated into the coupling region, $P_{in}$, is a function of the length, L, of the coupling region and its index of refraction, $n_3$. By adjusting the length, L, of coupling region 15, it is possible to adjust the amount of power coupled out of the fiber according to the relationship $$P_{out} = P_{in}(1 - e^{-\alpha_{vm}L}) \quad (1)$$

where $\alpha_{vm}$ is the attenuation constant of the coupling region 15 for the particular propagation mode, $\beta_{vm}$, and L is the length of the coupling region.

As shown in FIG. 1, the leaky mode 17—17 will exit the fiber in the coupling region at an angle with respect to the fiber axis, z, of $$\theta = \cos^{-1} \frac{\beta_{vm}}{n_3 k} \quad (2)$$

where $k = 2\pi/\lambda$ is the free-space wave number of the propagating mode of wavelength, $\lambda$.

In order to more fully understand the propagation of guided waves in an optical fiber, a cursory review of the theory involved will be helpful. For example, see MARCUSE, D., *Theory of Dielectric Optical Waveguides*, Academic Press, N.Y., 1974, Chap 2. and pps. 62–64.

In the cylindrical coordinate system, the coordinates r, $\phi$, z as defined in FIG. 1, represent respectively, variations in the radial, angular and longitudinal directions. The longitudinal components of the electric and magnetic fields of propagating modes in a fiber have a radial variation which must satisfy the reduced wave equation. Expressed in cylindrical coordinates, the wave equation describing this radial dependence can be shown to have the form $$\frac{\delta^2 F(r)}{\delta r^2} + \frac{1}{r} \frac{\delta F(r)}{\delta r} + (K^2 - \frac{v^2}{r^2})F(r) = 0 \quad (3)$$

where $K^2 = n^2(r)k^2 - \beta^2$; $n(r)$ represents the index of refraction as a function of the radius, r; $k = 2\pi/\lambda$ is the previously defined free-space wave number, and $v$ is defined as the azimuthal mode order.

For step index fibers, F(r) can be shown to have solutions of the form $$F(r) = J_v(K_m r) \quad (4)$$

where $J_v$ is the Bessel function of the first kind of order $v$; m is the radial mode parameter and $(K_m a)$ represents the $m^{th}$ root of $J_v$, for $\beta_{vm}$ and core radius a.

Thus, for each $v$, there is a set of m such that a propagating mode, $\beta_{vm}$, exists. Furthermore, Gloge and Marcatili in the aforementioned reference have shown that the term $$U^2(r) = n^2(r)k^2 - \beta^2 - \frac{v^2}{r^2} \quad (5)$$

must vanish at r = a, where a is the radius of the core 11. This implies that propagating modes must have propagation constants, $\beta_{vm}$ satisfying the relationship $$\beta_{vm} = [n^2(r)k^2 - v^2/a^2]^{\frac{1}{2}} \quad (6)$$

Figure 2A:
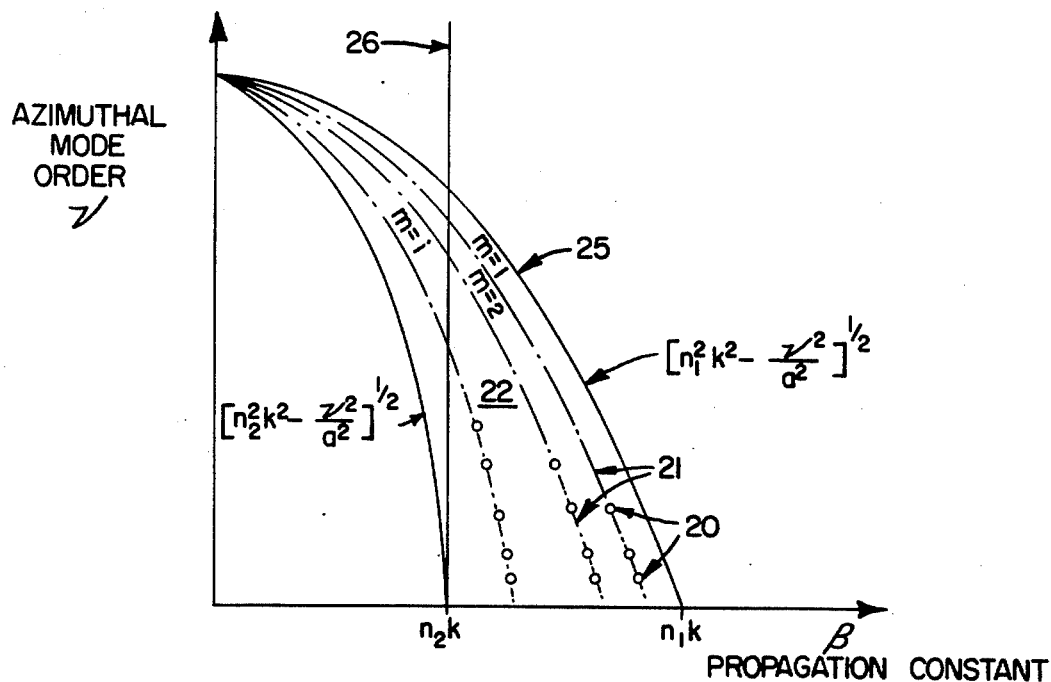
FIGS. 2(a) and 2(b) are curves helpful in explaining the conditions under which guided fiber modes become leaky modes.

FIG. 2(a) is a plot of equation (6) of the propagation constant, $\beta$, as a function of the azimuthal mode order $v$, for a step-index fiber of core radius a and index of refraction $n_1$ and cladding index $n_2$. For each $v$ and m, FIG. 2(a) indicates the permissible values which $\beta$ may assume in order for the corresponding modes $\beta_{vm}$ to be propagating modes. A few such modes 20—20 are illustrated and lie on a family of curves 21—21 associated with the radial parameter m.

All guided modes must have propagation constants $\beta$, which lie within the region 22 bounded by the curved section 25 intersecting the ordinate at a value of $\beta = n_1 k$ and a line 26 parallel to the absissa intersecting the ordinate at a value of $\beta = n_2 k$.

Figure 2B:
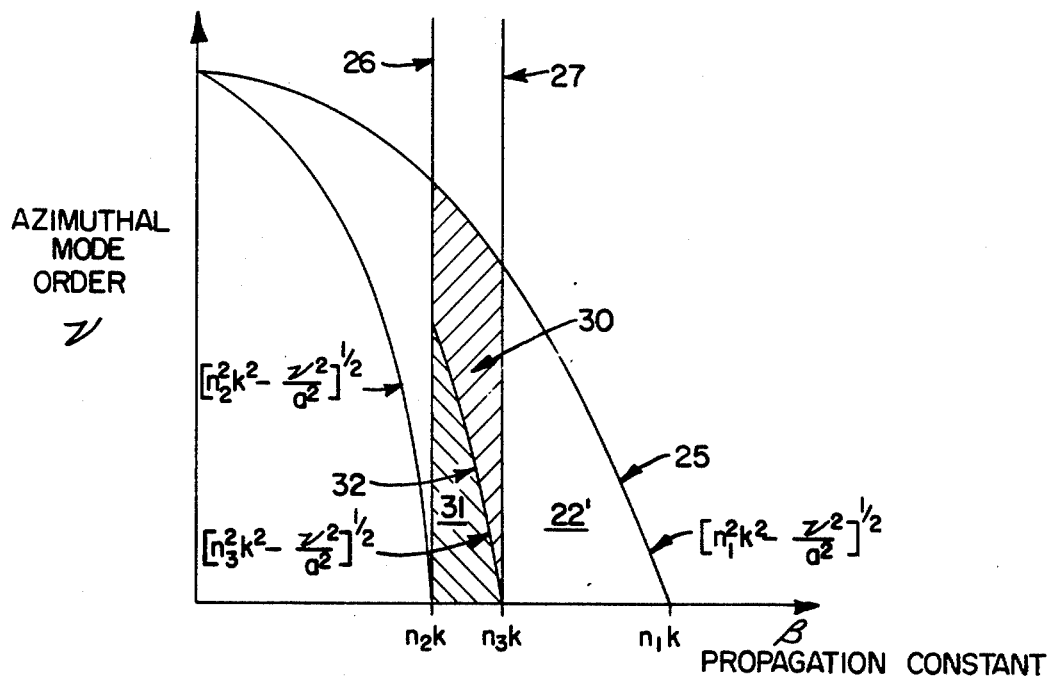

In a section 15 of the fiber in which the cladding index is increased to $n_3$ as illustrated in FIG. 1, FIG. 2(b) shows that the guided mode region 22' is reduced, with its lower bound moving to the position of line 27, which intersects the ordinate at the value of $\beta = n_3 k$. Modes having propagation constants which lie in the regions 30 and 31 bounded by the two lines 26 and 27 and the curved section 25, become leaky modes in the perturbed fiber section 15 and radiate energy through the cladding. Modes having propagation constants greater than $n_3 k$, in region 22', are unaffected by the perturbation. Modes having propagation constants which lie in region 31 bounded by line 26 and the curved section 32 are a special class of leaky modes called radiation modes. Essentially, all of the power in these modes is coupled or radiated out of the fiber in the perturbed region 15. For these modes, the attenuation constant, $\alpha_{vm}$, in equation (1) goes to infinity.

Although the curves of FIGS. 2(a) and 2(b) have been drawn to illustrate the boundaries of the propagation constants for a step-index fiber, similar curves may be constructed for graded-index fibers with any index profile, n(r). For the general case of a graded-index fiber, the propagation constant for guided modes must be between the limits $$n_{clad} k < \beta < [n_{core}^2 (a_{eff})k^2 - \nu^2/a_{eff}^2]^{\frac{1}{2}} \quad (7)$$

where $n_{clad}$ is the cladding index, $n_{core}$ ($a_{eff}$) is the value of the core index evaluated at the effective core radius, $a_{eff}$, and $a_{eff}$ can be determined from $$\frac{\delta}{\delta r} (n^2(r)k^2 - \nu^2/r^2) \mid a_{eff} = 0 \quad (8)$$

i.e., $a_{eff}$ is the value of r which causes equation (8) to be zero.

Figure 3:
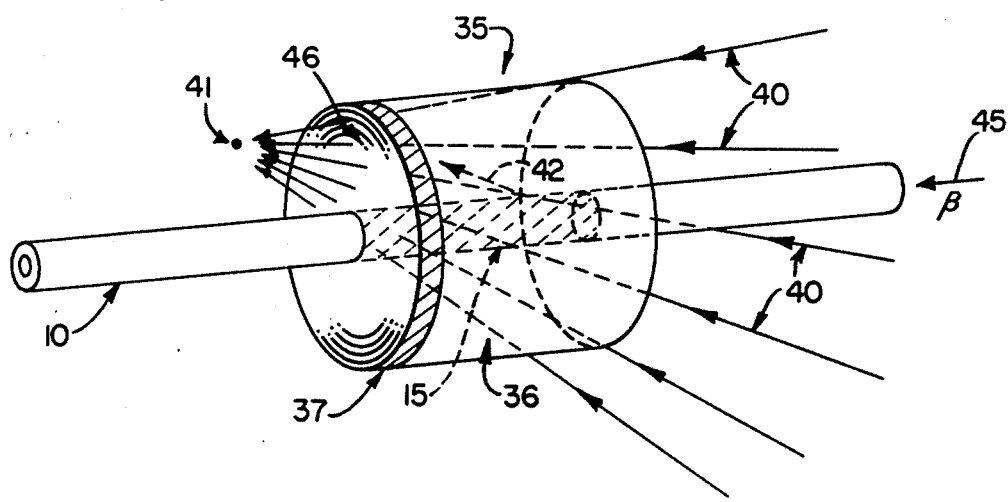
FIG. 3 illustrates a method for producing a holographic coupler in accordance with the principles of the invention.

In order to efficiently couple to the leaky mode radiation exiting from the fiber in the perturbed region, it is necessary to transform the leaky mode radiation to a desired spatial power pattern. This may include for example, focusing the leaky mode radiation to a point so that it may be detected or otherwise utilized. FIG. 3 illustrates a method for constructing a coupler 35 which utilizes a hologram to convert from the leaky mode radiation to the desired spatial power pattern.

In FIG. 3, the index of refraction of the cladding of an optical fiber 10 has been increased in the coupling region 15 in accordance with the aforementioned principles. The cladding index may be increased to the desired value $n_3$, by a variety of ways known to those skilled in the art, such as ion implantation by either chemical means or physical bombardment of the coupling region with ions. Alternatively, the coupler 35 may be a separate fiber section having similar core dimensions and index of refraction as fiber 10, but higher cladding index $n_3$, which is spliced or otherwise connected into the fiber 10.

Coupling region 15 is surrounded by a material 36 of index equal to or larger than the core index. One side of this material normal to the fiber axis includes a thin layer of a light sensitive emulsion 37. A reference light wave, illustrated as a plurality of rays 40—40, from a coherent source such as a laser, is focused by any conventional means, not shown, through the material 36 and the light sensitive emulsion 37 to a point 41 to produce the desired spatial power distribution at point 41. Simultaneously, the light sensitive emulsion 37 is illuminated by the leaky mode radiation 42 resulting from a single or multiple propagation modes 45 launched into the fiber from the same coherent source, which are converted to leaky modes in the coupling region 15. The leaky mode radiation 42 and the reference light wave 40 interfere with each other to produce an interference pattern on the light sensitive emulsion 37. Exposure of the light sensitive emulsion to this interference pattern results in a hologram 46 being produced on the emulsion.

Upon removing the reference wave and developing the light sensitive emulsion, the hologram thereafter acts as a mode filter and lens which will effectively couple only to the leaky modes which were present when the hologram was formed, to produce the desired spatial pattern at point 41. Therefore, to construct a holographic coupler which will couple only to one or more specific guided modes propagating in an optical fiber, it is simply necessary to launch the desired propagation modes into an optical fiber using well-known techniques, adjust the index of refraction of the coupling region to a value such that the guided fiber modes are converted into leaky modes and construct a hologram as aforedescribed, to focus the leaky modes to a desired spatial power pattern at a point.

Figure 4:
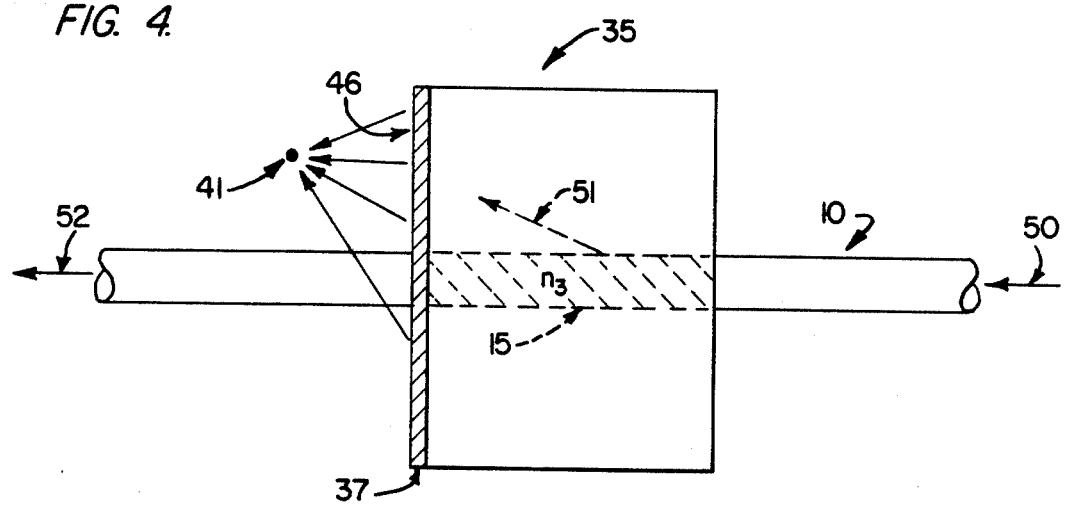
FIGS. 4 and 5 illustrate respectively, the operation of holographic couplers embodying the invention, in coupling energy out of and into an optical fiber waveguide.

FIG. 4 illustrates the action of the holographic coupler 35 constructed in accordance with the present invention, in extracting energy from a mode 50 propagating in an optical fiber 10. If the mode 50 propagating in the fiber from the right-hand end, is the same mode which was used to create the hologram 46, the diffracted wave pattern of the resulting leaky mode 51 will match the reference wave pattern used to create the hologram and will produce the desired spatial power pattern at point 41. This spatial power pattern may be directed to a detector located at point 41 or used to excite a second optical fiber, the end of which would be located at point 41.

As previously described, other guided modes having propagation constants greater than $n_3k$, where $n_3$ is the cladding index of the coupling region 15 of the coupler 35 would be unaffected by the coupler. All modes having propagation constants in the leaky mode range would be converted to leaky modes but would not be diffracted by hologram 46 and focused to point 41 unless they were present when the hologram was formed. As also previously explained, only a fraction of energy in mode 50 is converted to leaky mode 51. The remainder of the energy of the mode continues propagating through the guide with reduced power 52.

Figure 5:
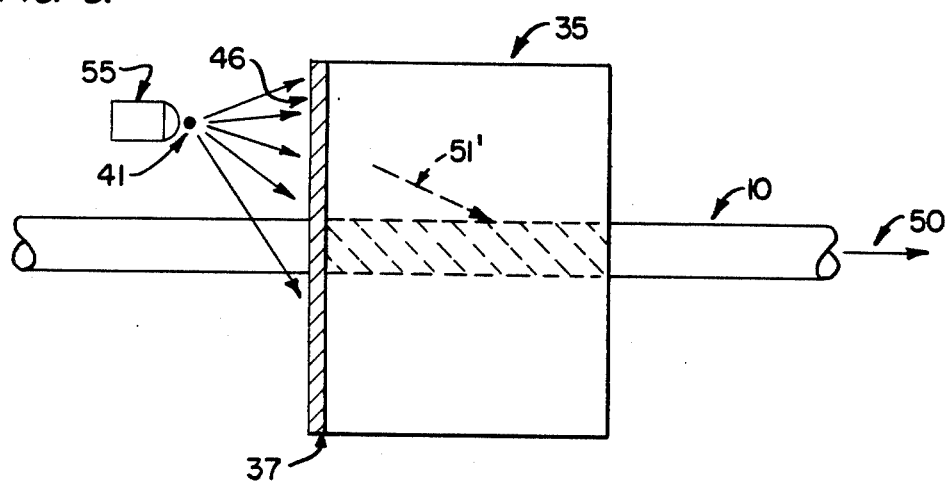

In FIG. 5, the coupler 35 of FIG. 4 is used as an input coupler to excite the same guided mode 50 in the fiber as was used in the holographic construction process. In this configuration, the hologram 46 is illuminated from a light source 55 located at point 41. The radiation pattern from the light source is focused into a wave 51' by the hologram at the proper angle, given by equation (2), to excite the guided mode 50, which is propagated to the right as illustrated. For purposes of explanation, wave 51' may also be defined as a leaky mode wave, although this terminology is not strictly correct in the sense that the term "leaky mode wave" implies a propagating mode resulting from guided mode energy lost by "leaking" through the fiber cladding. However, it is to be understood that, as used herein, the term leaky mode wave can refer to either light energy derived from some source which is transformed by hologram 46 to a wave 51' which excites a guided optical mode propagating in the fiber or to a wave which results from energy from a guided optical mode in the fibers being "leaked" through the fiber cladding.

Figure 6:
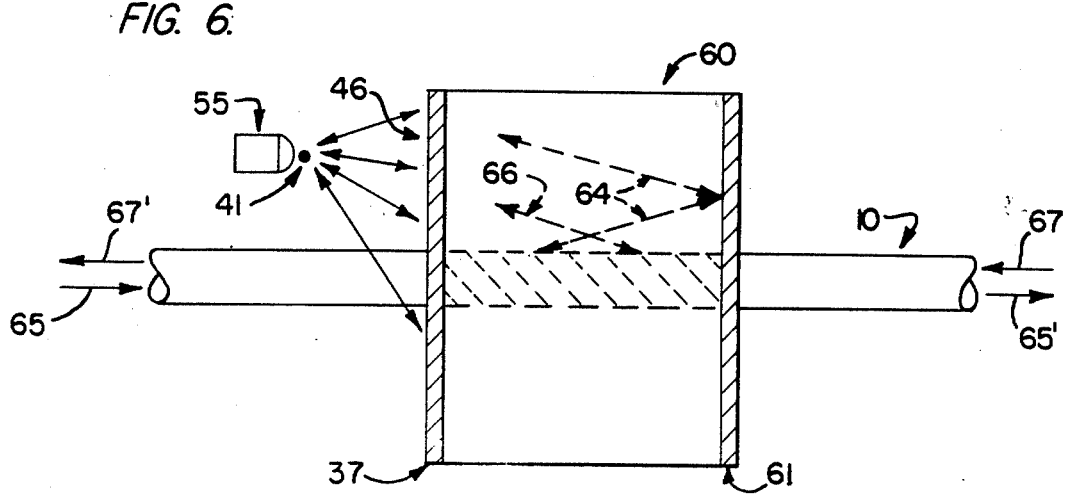
FIG. 6 shows the construction of a bidirectional holographic coupler.

The couplers of FIGS. 4 and 5 are unidirectional couplers in that they will only couple to fiber modes propagating in the proper direction. FIG. 6 illustrates the construction of a bidirectional coupler 60 which will permit coupling to modes propagating in either direction.

Figure 7:
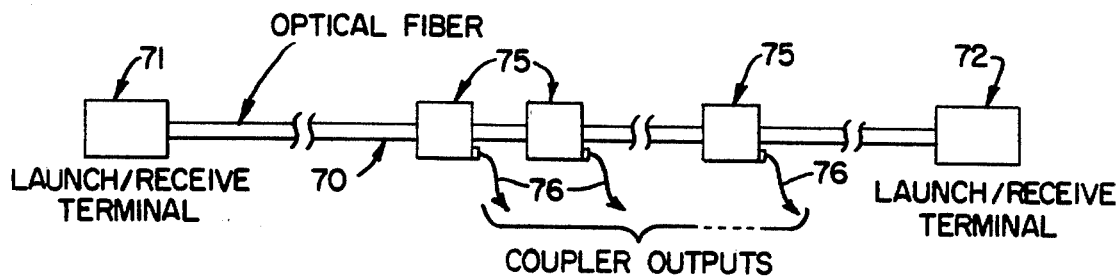
FIGS. 7 and 8 illustrate typical applications of holographic couplers embodying the invention, in various optical communication systems.
Figure 8:
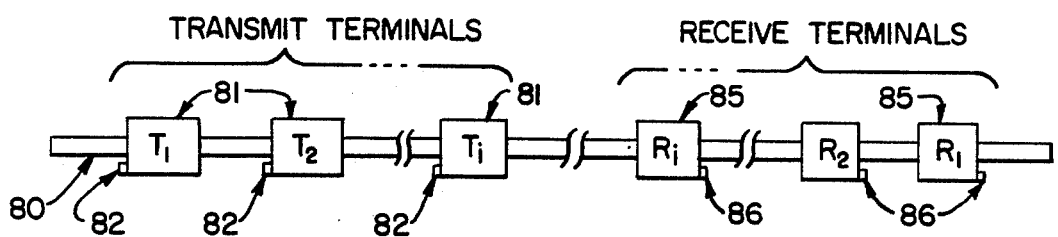

Coupler 60 is formed in the same manner as previously described except that a reflecting surface 61 such as a mirror is applied to the coupler surface which is in parallel opposition to the hologram 46. The reflecting surface 61 reflects leaky mode radiation 64 resulting from guided modes 65 propagating from the left-hand section of fiber 10 so that they may be focused by the hologram 46 to point 41. Leaky mode radiation 66 associated with guided modes 67 propagating from the right-hand section of fiber 10 follow the same ray path as described for FIGS. 4 and 5. As illustrated in FIG. 6, a bidirectional coupler 60 can be used to couple modes either into or out of fiber 10 in the same manner as previously described, by placing either a light source 55 or a detector at point 41. FIGS. 7 and 8 illustrate typical applications in which the holographic couplers may be used. In FIG. 7, an optical fiber distribution system is illustrated in which a single optical fiber 70 connects two end terminals 71 and 72. Terminals 71 and 72 may be conventional fiber-end type launch/receive terminals. Distributed along the fiber 70 are a plurality of couplers 75—75 of the leaky mode holographic type herein previously described, designed as receive terminals, and having outputs 76—76 which may be the outputs from detectors or which may be connected to other optical fibers. It is an advantage of the invention that these holographic couplers 75—75 may be placed at any point along the length of fiber 70.

Utilizing the previously described directional and mode discrimination characteristics of couplers 75—75, a variety of coupling arrangements may be obtained. The fiber distribution system of FIG. 7 may be either bidirectional or unidirectional depending upon the end terminals 71 and 72 and the couplers 75—75. Furthermore, a hierarchy may be established with certain fiber modes linking all terminals and other modes linking only specific terminals.

FIG. 8 illustrates an optical distribution system in which a plurality of holographic couplers are used for the multiplexing of data onto a fiber link 80. Couplers 81—81 labeled $T_1, T_2, \ldots T_i$, serve as transmitters and each includes a light source 82—82 which may be either the output from another fiber terminating in the coupler, an LED, or any other convenient source of light. Couplers 85—85, labeled $R_1, R_2, \ldots R_i$, serve as receivers and each includes either a detector 86—86 or a second fiber into which the coupled modes may be linked.

Each transmitter-receiver pair, $T_i$-$R_i$, is designed to couple to the same fiber mode, which may be distinct from the fiber mode on which each other transmitter-receiver pair operates. By arranging the placement of transmitter-receiver pairs on the fiber such that pair $T_i$-$R_i$ operates on the modes with the lowest value of $\beta$ and pair $T_1$-$R_1$ operates on modes with the highest values of $\beta$, the $T_1$-$R_1$ modes are unaffected by couplers $T_2$-$R_2, \ldots T_i$-$R_i$ existing between $T_1$ and $R_1$. Similarly, by selecting the propagation constants of the modes on which each transmitter-receiver pair operates to be higher than the propagation constants of modes on which intervening transmitter-receiver pairs operate, each transmitter-receiver pair will be capable of operating with distinct modes and hence will be capable of communicating independent of other transmitter-receiver pairs.

While the above has described the invention with reference to specific embodiments, it will be appreciated by those skilled in the art that variations are possible which do not depart from the spirit and intent of the invention and that applicant intends his invention to be limited only by the appended claims.

What is claimed is:

1. A method of constructing a coupler for coupling light into or out of an optical fiber waveguide by selectively coupling to guided optical modes, comprising the steps of:

converting at least one selected guided optical mode propagating in the optical fiber waveguide to a leaky mode wave wherein a portion of the energy in the selected guided mode is coupled through the cladding of the optical fiber, by adjusting the index of refraction of a portion of the optical fiber cladding constituting a coupling region to a value n, said value being greater than the index of refraction of the fiber cladding outside of the coupling region and said value selected such that the propagation constant, $\beta$, of said selected guided optical mode is less than the product nk, where k is the free space wave number of said guided optical mode; and providing a transformation between said leaky mode wave and a desired spatial power distribution at a point, such that said leaky mode wave is focused to said point.

2. The method of claim 1 wherein said converting step further comprises the step of adjusting the amount of power coupled into or out of said optical fiber by adjusting the length of said portion of the optical fiber over which the cladding index is increased.

3. The method of claim 1 wherein said transforming step further comprises the step of forming a hologram on a light sensitive emulsion by interfering a coherent reference light wave focused to said point, with said leaky mode wave to form an interference pattern on the light sensitive emulsion.

4. The method of claim 3 which further comprises the step of providing a reflecting surface in parallel opposition to said hologram, such that said transforming occurs for said leaky mode wave corresponding to said guided optical mode propagating in either direction in said optical fiber, thereby providing a bidirectional coupler.

5. A coupler for coupling light into or out of an optical fiber waveguide constructed in accordance with the method of claim 1.

6. An apparatus for coupling light into or out of an optical fiber waveguide by selectively coupling to guided optical modes, comprising:

a coupling region formed along a portion of the length of the optical fiber for converting at least one selected guided optical mode propagating in said optical fiber to a leaky mode wave propagating outside of said fiber or from said leaky mode wave propagating outside of said fiber to said guided optical mode propagating in said fiber, said coupling region characterized by having the index of refraction of the fiber cladding within said coupling region adjusted to a value n, said value being greater than the index of refraction of the fiber cladding outside of said coupling region and said value selected such that the propagation constant, $\beta$, of said selected guided optical mode is less than the product nk, where k is the free space wave number of said guided optical mode; and means in optical correspondence with said leaky mode wave for providing a transformation between the leaky mode wave and a desired spatial power distribution at a point.

7. The apparatus of claim 6 wherein said coupling region may be located at any place along the length of the optical fiber.

8. The apparatus of claim 6 wherein said means for providing a transformation comprises a hologram, formed on a light sensitive emulsion by interfering a coherent reference light wave focused to said point with said leaky mode wave, such that said desired spatial power distribution is obtained.

9. The apparatus of claim 8 further comprising a reflecting surface in parallel opposition to said hologram such that said spatial power distribution is obtained for said leaky mode wave corresponding to said guided optical mode propagating in either direction in said optical fiber.

10. The apparatus of claim 6 further comprising a light source at said point wherein said guided optical mode may be launched into said optical fiber.

11. The apparatus of claim 6 further comprising a light detector at said point whereby said guided optical mode may be detected to derive any information transmitted by said mode.

* * * * *